United States Patent [19]

Benton et al.

[11] Patent Number: 4,859,394
[45] Date of Patent: Aug. 22, 1989

[54] METHOD OF MOLDING A ONE PIECE PLASTIC BALL NUT

[75] Inventors: Robert L. Benton, Bay City; Joseph A. Rutkiewicz, Saginaw, both of Mich.

[73] Assignee: Thomson Saginaw Ball Screw Co., Inc., Saginaw, Mich.

[21] Appl. No.: 56,273

[22] Filed: May 26, 1987

Related U.S. Application Data

[63] Continuation of Ser. No. 794,822, Nov. 4, 1985, abandoned, and a continuation-in-part of Ser. No. 541,550, Oct. 13, 1983, abandoned.

[51] Int. Cl.[4] .................. B29C 33/42; B29C 39/02; B29D 15/00
[52] U.S. Cl. ................. 264/225; 74/424.8 R; 264/227; 264/318
[58] Field of Search .......... 264/227, 225, 318; 74/216.3, 424.8 R, 459, 424.8 NA

[56] References Cited

U.S. PATENT DOCUMENTS

| 3,313,873 | 4/1967 | Dembiah | 74/459 |
| 4,173,907 | 11/1979 | Lundgren | 74/424.8 R |
| 4,272,476 | 6/1981 | Benton | 264/225 |
| 4,342,235 | 8/1982 | Benton | 264/225 |

OTHER PUBLICATIONS

"Silicones Ease Many Production Tasks", *Plastics World*, Oct. 63, pp. 214–215.

*Primary Examiner*—James Lowe
*Attorney, Agent, or Firm*—Learman & McCulloch

[57] ABSTRACT

By using an existing ball nut and ball nut screw of a ball nut screw assembly as master models, imprint molds can be molded from a silicone rubber material which positively profiles the threading of the ball nut and ball nut screw with the crossover channel in the master model of the ball nut. A thermoset resin is added to the imprint molds and cured to form unitized all plastic ball nuts and ball nut screws with the helical grooving for accommodating the train of balls including the crossover channel in the ball nut molded therein to thereby provide an easily reproducable ball nut and screw assembly.

2 Claims, 2 Drawing Sheets

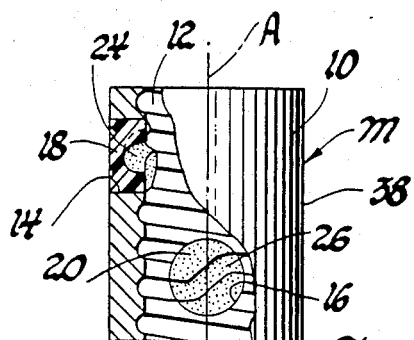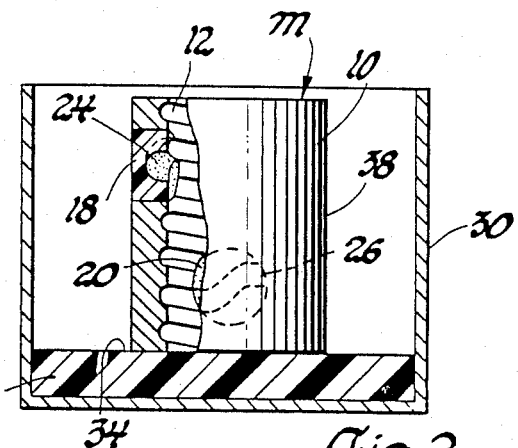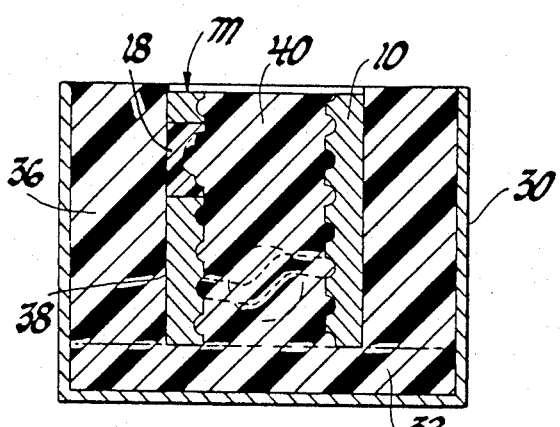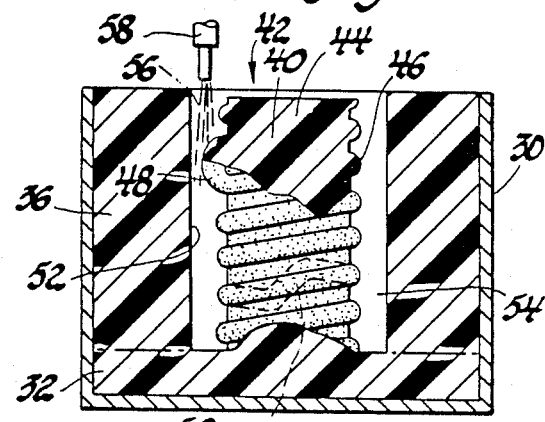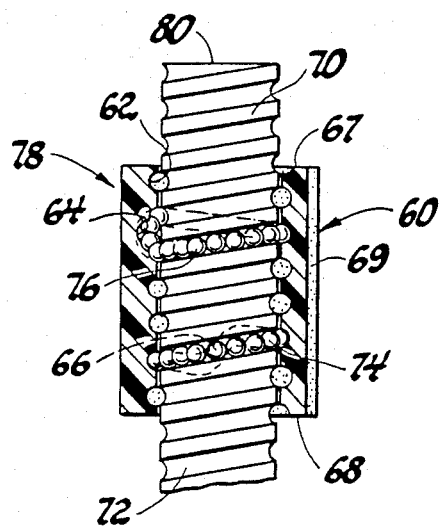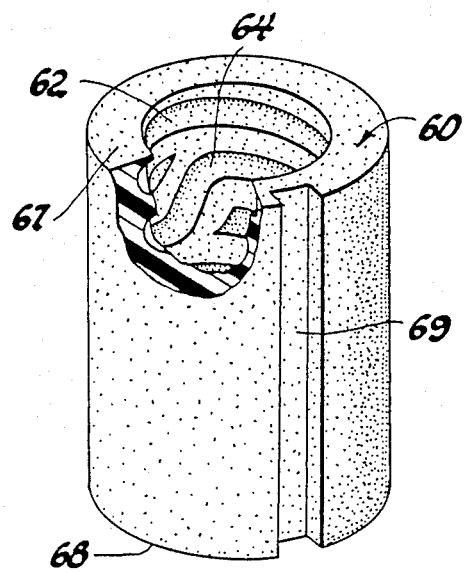

METHOD OF MOLDING A ONE PIECE PLASTIC BALL NUT

This application is a continuation of application Ser. No. 794,822 filed Nov. 4, 1985, which is a continuation-in-part of application Ser. 541,550 filed Oct. 13, 1983, both now abandoned.

This invention relates to ball nuts and screws and more particularly to a new and improved unitized molded ball nut with an integral internal crossover channel and to a molded screw for the ball nut and further to a new and improved method of manufacture of ball nut and screw components.

BACKGROUND OF THE INVENTION

Ball nut and screw assemblies have been employed in a wide range of applications to smoothly convert rotary or linear input into a linear or rotary output with a high degree of quietness and efficiency. In U.S. Pat. No. 4,272,476, issued June 9, 1981 to R. L. Benton, entitled "Manufacture of Ball Nut With Internal Cross-Over Path For Ball Recirculation" and assigned to the assignee of this invention, a method of molding internal ball crossover channels of plastics material for adjacent turns of a helical ball track of a ball nut is disclosed. With such molded ball crossover channels, manufacture is improved and a new and improved ball nut is produced.

SUMMARY OF THE INVENTION

As a further advancement in this art, the present invention provides a new and improved one-piece ball nut of plastics material for a ball nut and screw assembly in which the internal helical ball track with crossover channels is formed when the nut is molded. With this invention, the radial holes required by prior ball nuts for reception of crossover inserts or a moldable material for making crossover channels are completely eliminated. Additionally, this invention provides a new and improved all plastics screw to mate with the nut to provide an all plastics screw and nut which are operatively connected by a train of steel balls that run in an endless and completely smooth helical track formed by the cooperating ball nut and screw.

More particularly in this invention, a cylindrical ball nut with one or more inserts with molded or machined metallic ball crossover channels therein is selected for use as a master model. The crossover inserts in the preferred embodiment have a precise three-dimensional channel cut into the internal face thereof to provide a track to feed the balls between adjacent turns of the internal helical groove of the nut. After the ball inserts are installed, the ball nut is placed in a container in which a small quantity of viscous material, such as silicone rubber has been poured. A particular form of this material suitable for this invention may be obtained under the tradename SILASTIC. This silicone rubber material has been cured to an extent to allow the ball nut to sit on the upper surface. After the ball nut as the master model is positioned in an upright manner on the silicone rubber, an additional quantity of silicone rubber material is added to the container until the master model is completely covered on the inside and outside diameters. The added plastics material is then allowed to cure. After curing, the master model is readily removed from the resilient slippery silicone rubber material to thereby form a resilient, unitized mold. This mold has a positive internal imprint of the helical groove of the model with the internal crossovers between adjacent turns of the groove and a radially spaced cylindrical outer wall. A thermoset epoxy resin is subsequently poured into the mold to fill the mold to its upper limit. This resin is allowed to harden into an all plastic ball nut which is then easily removed from the resilient mold of silicone rubber. The molded nut is an exact duplicate of the master model from which the mold was made with helical ball grooves and integral internal crossover channels and is ready for use when a screw and balls are added in a well-known manner.

The ball nut screw is made in a manner similar to the nut and provides a new and improved screw for the ball nut and cooperates therewith to provide an assembly with a completely smooth and uninterrupted ball recirculation passage with optimized low friction capability. Preferably, a machined metal master model screw is made with great precision to have a helical ball track to precisely match that of the master model ball nut referenced above so that a train of steel balls of predetermined diameter smoothly circulate therein. The master model screw is placed in a container in which a layer of silicone rubber has been poured and allowed to cure to form a flat support for the master model screw. After this placement, additional silicone rubber material is added until the master model screw is completely covered on the outside and, on the inside, in the event a hollow screw is to be molded. With the cured silicone rubber being quite resilient and slippery, the metallic master model screw is easily removed without damage to any of the mold threads. After such removal, the resulting mold has a positive imprint of the helical ball track of the metallic master model screw. Subsequently, the master mold is employed to form the plastic ball nut screws. To this end, a thermoset epoxy resin is poured into the master mold to fill the mold to its upper limit. The resin is allowed to harden into the all plastic screw which is easy to remove from the highly flexible and slippery imprint screw mold of silicone rubber. The molded screw is an exact duplicate of the master model from which the mold was made with the helical ball grooves formed therein. This screw is ready to use with the plastic ball nut as described above or even with a metal ball nut if such is required in the construction in which this assembly is to be employed.

The steel balls are added by moving the screw in the nut until the end of the screw is just below the endless track provided by the crossover channel between adjacent turns of the ball groove. After the balls are fed into the assembly, the screw is advanced past the endless track so that the balls are trapped therein and will recirculate in an endless track to make a low-friction, high-efficiency ball nut and screw assembly. Accordingly, with this invention there is provided a new and improved method for making a large quantity of identical ball nuts with integral, internal crossover channels connecting adjacent turns of the internal ball groove. This invention further provides for a new and improved one-piece ball nut for a ball nut and screw assembly molded from an epoxy resin. This invention further provides for a new and improved method for making a large quantity of identical ball nut screws with optimized threading for an all plastics ball nut and screw assembly and further to a new and improved screw for a ball nut and screw.

With this invention, an all epoxy ball nut to mate with an all epoxy screw is provided. This is of particular importance where relative light loads are encountered which lend itself to this type of plastic material and manufacturing method. Where the lead is very high, almost to the point of being a helical spline, a metallic screw and ball nut would be very expensive and in many instances impractical because of the cost of grinding high leads. However, when made from the process of the invention, the ease of manufacture of large leads do not increase costs and this low friction motion converter is economically feasible. It would, of course, be possible to manufacture screws or ball nuts with any lead from single annular grooves to straight splines. Ball retainers, qualification slots can be added on the screws with no difficulty. Ball retainers and qualification slots can be added on the screws with no difficulty. Ball retainers, qualification slots and internal ball return systems can also be readily added to ball nuts. Almost any type of feature can be molded on the ball nut or screw on either the outside or inside diameters. Such features are possible because the resilient silicone core is able to flex away from the master mold and leave all features required on the epoxy ball nut or screw.

These and other features, objects and advantages of this invention will be more apparent from the following detailed description and drawing

BRIEF DESCRIPTION OF THE DRAWING

FIG. 1 is a side elevational view, partly in cross-section, of a ball nut which forms a model by which other ball nuts are made.

FIG. 2 is a cross-sectional view of a contain having a layer of silicone rubber material therein and on which the model ball nut of FIG. 1 has been seated.

FIG. 3 is a view similar to FIG. 2 in which additional quantities of silicone rubber have been poured to surround the outer periphery of the ball nut and to fill the inner volume of the ball nut.

FIG. 4 is a view similar to FIG. 3 with the ball nut model removed to make a resilient mold of a ball nut of silicone rubber material.

FIG. 5 is a perspective view showing the plastic ball nut made from the mold of FIG. 4 and removed therefrom.

FIG. 6 is a view partially in section showing the ball nut assembled on a screw with a train of balls therein to form a ball nut and screw assembly.

DETAILED DESCRIPTION OF THE INVENTION

Figure 7:
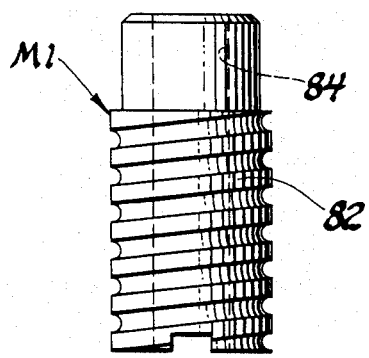
FIG. 7 is a side elevational view of a ball nut screw which forms a master model by which other ball nut screws are made.

Referring in greater detail to the drawing, there is shown in FIG. 1 a cylindrical ball nut 10 of steel or other suitable material having an internal and helical ball thread groove 12 ground or tapped in the inner cylindrical wall thereof. Predetermined and accurately sized circular holes 14, 16 are drilled in the ball nut 10 at 90° to the longitudinal axis A thereof and qualified to the thread groove 12. This qualification crosses two adjacent turns of the ball thread groove 12 as best illustrated in FIG. 1. The holes 14, 16 can be offset from one another such as shown in FIG. 1 or be in alignment with each other, if desired.

To provide a guide for endless trains of balls used in ball nut and screw assemblies such as shown in FIG. 6, special crossover inserts 18, 20 are provided. These crossover inserts may be molded in place as described in detail in U.S. Pat. No. 4,342,235 issued Aug. 3, 1982 to R. L. Benton, entitled "Ball Nut With Internal Crossover For Ball Recirculation" herein incorporated by reference or made, as shown from metal plugs in conventional fashion. The inner faces of these inserts have precise three-dimensional crossover channels 24, 26 formed therein each with depth and angularity to direct and feed a ball train circulating between adjacent turns of the helical ball groove so that endless and generally circular ball tracks are formed. With such construction, the balls of each train will be retained and recirculated in their endless tracks in the nut as the screw is rotated and linearly advanced.

After the inserts with the crossover channels or tracks have been installed, the ball nut is used as a master model M and placed in an open top container 30 in which a quantity of viscous silicone rubber 32 such as SILASTIC material has been poured to form a base. As shown in FIG. 2, the silicone rubber is partially cured to provide sufficient support so that the master model M can rest on the upper surface 34 thereof. After the master model M is positioned as shown in FIG. 2, a second quantity of viscous silicone rubber 36 is added into the container to surround the cylindrical outer surface 38 of the master model M. Also a quantity of silicone rubber 40 is supplied to fill the interior of the master model M as shown in FIG. 3. As the silicone rubber 36 and 40 cures, it bonds or adheres to the base silicone rubber 32 to form a highly resilient unit which does not adhere to the inner or outer surfaces of the master nut. The master nut is subsequently manually and easily removed from the cured resilient silicone rubber so that an all silicone rubber imprint mold 42 is formed in container 30 as shown in FIG. 4. The imprint mold 42 has a cylindrical upstanding core 44 formed from the silicone rubber 40 providing a positive image 46 of the helical ball thread groove 12 and positive images 48, 50 of the two crossover channels 24 and 26. The silicone rubber 36, when cured, forms a cylindrical wall 52 radially spaced from the cylindrical core 44 to form a cavity 54 for molding a one-piece ball nut having internal helical ball tracks and crossover channels therein.

After formation of the mold 42, a quantity of thermoset epoxy resin 56 is fed from supply tube 58 to fill the cavity 54. This resin is allowed to cure and harden into a one-piece all plastic ball nut 60 (FIGS. 5 and 6) having an internal ball track 62 with crossover channels 64, 66 formed therein which are identical to those of the master model M. This ball nut 60 is easily removed from the imprint mold 42 because of the resiliency and low friction of the cured silicone rubber which does not adhere to the thermoset resin nut 60. The end surfaces 67, 68 of the nut 60 can be finished by cutting or by any suitable manner to remove excess resin and to insure squareness.

Subsequent to the removal of the ball nut from the imprint mold, an external keyway 69 is cut or otherwise formed in the ball nut 60 so that it can be held from rotation by a key in which the ball nut and screw assembly may be used. The external groove 69 can be molded in the molding process if desired.

In FIG. 6, the one-piece plastic ball nut 60 with internal crossover channels molded therein is assembled with a ball screw 70 of metal or plastics material as explained below. This screw has a helical ball groove 72 formed therein which corresponds to the groove of the nut 60. Trains of spherical balls 74, 76 are added to complete the ball nut and screw assembly 78 highly suitable for carrying light and moderate loads.

Ball train 74 may be installed by moving the screw until the end 80 thereof is positioned below the start of the crossover channel 64. The balls are then fed into the endless passage made by the ball nut and screw. The screw is subsequently turned and advanced so that the ball train is captured in the endless tracks. Ball train 76 is installed in a similar manner to complete the new and improved ball nut and screw assembly 78.

With this invention, the imprint mold 42 can be employed to make a series of identical all plastic ball nuts since the silicone rubber mold has high resiliency and durability and will not be damaged in the manufacturing process.

In addition to making a series of all identical plastic ball nuts, this invention further features the production of all plastic ball nut screws to mate with corresponding nuts. To this end, FIGS. 7-10 disclose a method similar to that of FIGS. 1-5 for making an all epoxy ball nut screw to precisely mate with the ball nut 60 of FIG. 5.

FIG. 7 specifically discloses a nut screw 82 hollowed with an axial passage 84 formed therethrough to provide a master model M1. This ball nut screw is preferably a steel screw which is precision finished to closely match with the master model ball nut 10 of FIG. 1 when a ball train such as ball train 74 of FIG. 6 is introduced to operatively interconnect these elements for easy running with reduced friction.

Figure 8:
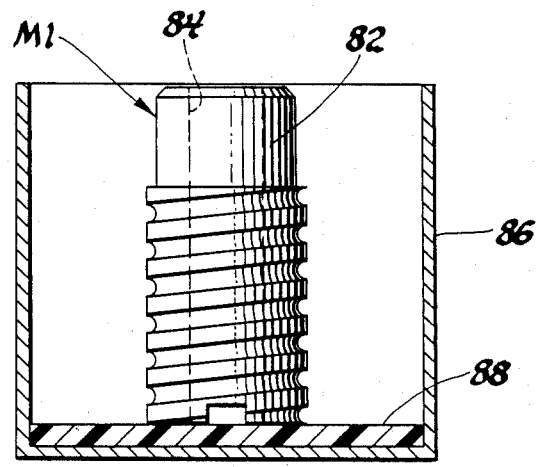
FIG. 8 is a cross-sectional view of a container having a layer of silicone rubber material therein on which the master ball nut screw of FIG. 7 has been seated.
Figure 9:
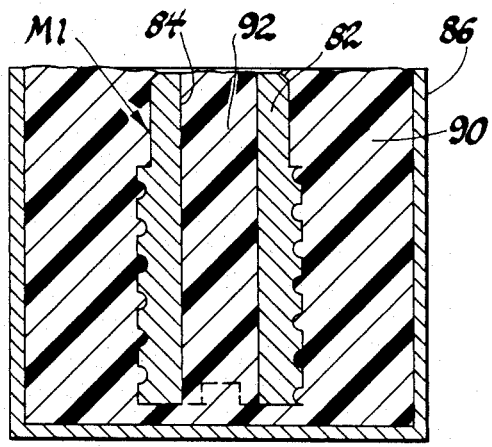
FIG. 9 is a view similar to FIG. 8 in which additional quantities of silicone rubber have been poured to surround the outer periphery of the ball nut screw and to fill the inner volume thereof.
Figure 10:
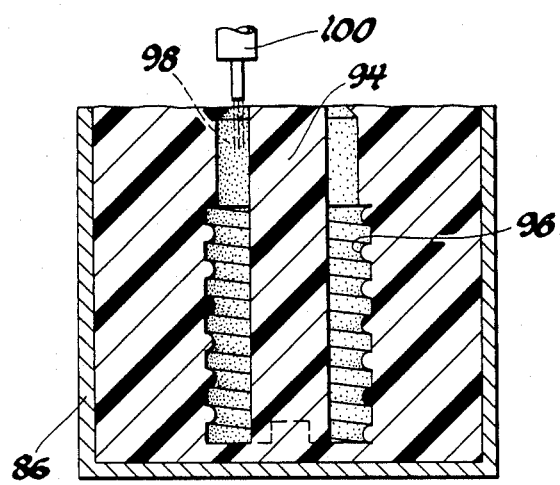
FIG. 10 is a view similar to FIG. 9 with the ball nut screw model removed to make a resilient mold of the ball nut screw of silicone rubber material.
Figure 11:
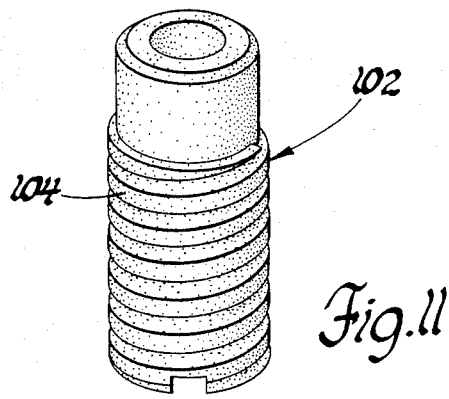
FIG. 11 is a perspective view showing the plastic ball nut screw removed from the mold of FIG. 10.

FIG. 8 illustrates the master model ball nut screw 82 placed in an open top container 86 in which a small quantity of viscous silicone rubber has been poured to form a support surface for the screw. As shown in this Figure, the silicone rubber is sufficiently cured to support the master model M1 which rests on the upper surface 88 thereof. After the master model is positioned in FIG. 8, a second quantity of viscous silicone rubber 90 is added into the container to surround the outer cylindrical surface of the master model. Also a quantity of liquefied silicone rubber 92 is supplied to fill the interior thereof. As the silicone rubber cures, it bonds or adheres to the upper surface 88 of the silicone rubber to form a highly resilient and slippery unit which does not adhere to the surfaces of the master model M1. The master model M1 is subsequently, manually and easily removed from the cured resilient silicone rubber so that an all silicone rubber imprint mold is formed in the container 86 as shown in FIG. 8. The imprint mold has a cylindrical upstanding core 94 formed from the silicone rubber providing a positive image of the smooth inner wall of the hollow master model M1 screw. The surrounding outer surface 96 of the imprint mold forms the positive image of the helical ball thread groove of the master model. After forming the imprint mold, a quantity of thermoset resin 98 is fed from the supply tube 100 to fill the cavity of the imprint mold. This resin is allowed to cure and harden into the one-piece all plastic ball nut screw 102 of FIG. 11 having an external helical ball track 104 formed therein which matches the ball track of the master model M1. This ball nut screw is easily removed from the imprint mold because of the resiliency and slipperiness of the silicone rubber material and since this material does not adhere to the thermoset resin. The end surfaces of the screw is finished by cutting or by any suitable manner to remove excess resin and to insure squareness.

While a preferred ball nut and ball nut screw and method of manufacture of these components have been described to illustrate the invention, other methods and materials can be employed. For example, in making a ball nut or a ball nut screw, the container can be partially filled with silicone rubber or other suitable material and the master can be partially submerged therein. After such submerging, the silicone rubber can be poured around the exterior and the open interior of the master to complete formation of an imprint mold which will then be used to mold the plastic ball nut or screw of thermoset resin.

The detailed description and drawings of the preferred embodiments of this invention for the purposes of explaining the principles thereof are not to be considered as limiting or restricting the invention since many modifications may be made by the exercise of skill and the art without departing from the scope of the invention as set forth in the following claims.

The embodiments of the invention in which an exclusive property or privilege is claimed are defined as follows:

1. A method of pour molding a one-piece plastic ball nut for a ball nut and screw assembly, the ball nut have formed therein an internal helical ball groove and a ball return crossover channel, the method comprising the steps of:

placing a master model ball nut within a container, the model ball nut having a cylindrical body with inner and outer cylindrical walls and an opening formed axially through the body, the inner cylindrical wall having an internal helical ball groove, with turns connected by an internal crossover channel, formed therein for carrying a train of balls, the master model ball nut cylindrical body being a metal body provided with a radial opening formed in its outer wall which intersects the longitudinal axis of the nut and two adjacent turns of the helical ball groove, and there being a plastic insert provided in the radial opening which has a crossover channel internally formed therein to provide a ball path which interconnects the two adjacent turns of the helical groove;

adding a silicone rubber material to the container until the material covers the outer cylindrical wall of the master model ball nut and fills the axial opening thereof;

curing said silicone rubber material;

removing the master model ball nut from the cured silicone rubber material so that said silicone rubber material forms a unitized resilient and slippery imprint mold for said one-piece ball nut, the unitized imprint mold having a cylindrical wall and an upstanding cylindrical core integrally joined to the cylindrical wall, the wall and the core defining a cavity between them;

filling the cavity of the unitized imprint mold with a plastic resin;

allowing said resin to harden to form an all plastic ball nut with a helical ball groove and crossover channel formed therein; and removing the plastic ball nut from the imprint mold to clear said imprint mold so that another plastic ball nut can be molded therein.

2. A method of forming a plastic one-piece ball nut for a ball nut and screw assembly by pour molding, the method comprising the steps of:

introducing a first quantity of a liquefied silicone rubber material into a container so that the material fills the container to a predetermined level;

curing the first quantity of silicone rubber material, the cured material defining a base layer of material;

placing a master model ball nut within the container and resting on the base layer of cured material, the master model ball nut having an outer wall and an inner cylindrical wall defining an interior area, the inner cylindrical wall having formed therein an internal helical ball groove and a ball return crossover channel communicating with the helical ball groove;

introducing a second quantity of liquefied silicone rubber material into the container so that the material substantially fills the interior area of the master model ball nut and the space defined by the container and the outer wall of the master model;

curing the second quantity of silicone rubber material, the second quantity of cured material adhering to the base layer of cured material to define an imprint ball nut mold having an upstanding cylindrical core and a cylindrical wall integrally joined to the cylindrical core, the cylindrical wall having a positive profile of the helical ball groove and crossover channel of the master model ball nut;

removing the master model ball nut from the imprint ball nut mold formed from the cured first and second quantities of material, the imprint mold having formed therein a cavity defined by the mold cylindrical wall and the upstanding cylindrical core;

introducing a plastic material into the cavity of the imprint mold;

hardening the plastic material, the hardened plastic mater defining a reproduction ball nut of the master model ball nut; and removing the reproduction ball nut from the imprint mold.

* * * * *

UNITED STATES PATENT AND TRADEMARK OFFICE
CERTIFICATE OF CORRECTION

PATENT NO. : 4,859,394

DATED : August 22, 1989

INVENTOR(S) : Robert L. Benton and Joseph A. Rutkiewicz

It is certified that error appears in the above-identified patent and that said Letters Patent is hereby corrected as shown below:

Column 6, line 38, insert -- master -- after "the".

Column 8, line 20, change "mater" to -- material --.

Signed and Sealed this

Seventh Day of August, 1990

Attest:

HARRY F. MANBECK, JR.

*Attesting Officer*      Commissioner of Patents and Trademarks